(12) United States Patent
Brown

(10) Patent No.: US 12,361,464 B1
(45) Date of Patent: Jul. 15, 2025

(54) PICTURE ORDERING AND PROCESSING

(71) Applicant: Todd E Brown, Woodland Hills, CA (US)

(72) Inventor: Todd E Brown, Woodland Hills, CA (US)

( * ) Notice: Subject to any disclaimer, the term of this patent is extended or adjusted under 35 U.S.C. 154(b) by 0 days.

(21) Appl. No.: 18/354,473

(22) Filed: Jul. 18, 2023

Related U.S. Application Data

(63) Continuation of application No. 18/193,521, filed on Mar. 30, 2023, now abandoned.

(51) Int. Cl.
| | |
|---|---|
| *G06F 15/00* | (2006.01) |
| *G06F 3/12* | (2006.01) |
| *G06Q 30/0601* | (2023.01) |
| *H04N 1/00* | (2006.01) |
| *H04N 1/32* | (2006.01) |
| *H04N 1/34* | (2006.01) |
| *H04W 4/14* | (2009.01) |

(52) U.S. Cl.
CPC ....... *G06Q 30/0621* (2013.01); *G06F 3/1204* (2013.01); *G06F 3/1272* (2013.01); *G06F 3/1288* (2013.01); *H04N 1/00137* (2013.01); *H04N 1/00145* (2013.01); *H04N 1/00177* (2013.01); *H04N 1/32117* (2013.01); *H04N 1/34* (2013.01); *H04N 2201/0084* (2013.01); *H04N 2201/3205* (2013.01); *H04N 2201/3207* (2013.01); *H04N 2201/3209* (2013.01); *H04N 2201/3216* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 2008/0288594 A1* | 11/2008 | Muus | G06Q 10/107 709/206 |
| 2013/0321856 A1* | 12/2013 | Bell | G06F 3/1288 358/1.15 |
| 2014/0118562 A1* | 5/2014 | Bivolarsky | H04N 21/234363 348/207.1 |
| 2016/0171525 A1* | 6/2016 | Ezra | G06Q 30/0225 705/14.12 |
| 2017/0257488 A1* | 9/2017 | Mayana | H04M 3/527 |

\* cited by examiner

*Primary Examiner* — Mark R Milia
(74) *Attorney, Agent, or Firm* — Colin P Abrahams

(57) ABSTRACT

A method of processing a photograph comprises capturing or downloading the photograph onto a mobile electronic device with text messaging capabilities. The photograph is then transmitted in a text message to a remote server which is able to identify the mobile electronic device, and to match the mobile electronic device with information stored in a database relating to the mobile electronic device. The photograph is transmitted to a printer for printing the photograph on a physical medium. The photograph on the physical medium is then transported to a destination point address contained in the information stored in the database.

13 Claims, 12 Drawing Sheets

PICTURE ORDERING AND PROCESSING

CROSS REFERENCE TO RELATED APPLICATIONS

This application is a continuation application of U.S. patent application Ser. No. 18/193,521 filed Mar. 30, 2023, which is a continuation in part application of U.S. patent application Ser. No. 17/705,150 filed Mar. 25, 2022, which is continuation in part application of U.S. patent application Ser. No. 17/576,805 filed Jan. 14, 2022, which is a continuation application of U.S. patent application Ser. No. 17/491,170 filed Sep. 30, 2021, which is a continuation of U.S. patent application Ser. No. 16/031,226 filed Jul. 10, 2018, which claims the benefit of U.S. Provisional Patent Application No. 62/532,844 filed Jul. 14, 2017, U.S. Provisional Patent Application No. 62/536,800 filed Jul. 25, 2017, and U.S. Provisional Patent Application No. 62/577,914 filed Oct. 27, 2017, all of which are incorporated herein by reference in their entirety.

FIELD AND BACKGROUND OF THE INVENTION

This invention relates to picture ordering and processing. The invention therefore comprises devices, methods and systems whereby a user thereof provides an electronic version of a picture from a mobile device to a remote computer and obtains a printed version thereof.

The vast majority of people in this day carry with them most of the time a mobile device, which in addition to being a telephone, is many other things as well. Most of the sophisticated mobile devices which a person carries also have the ability to send and receive text messages, check and send email messages, connect to the Internet, and operate as a GPS device, to name just a few. In addition, most of these mobile devices are capable of downloading computer software generally known as "apps" so that the mobile device can be used for a huge gamut of activities. Such apps may include games, news sources, weather information, calendars, retail outlet payment software, dictionaries, connection to online stores, and others. The list of these apps is almost endless and they grow in number daily in their variety and specificity.

While a mobile device in accordance with this invention may typically be a mobile phone, the invention covers other mobile devices as well, and may include tablets or other devices which are capable of storing different types of data, including digital photographs.

The mobile device referred to above is also, in most cases, a camera. Moreover, the quality of this inbuilt camera in such devices has improved dramatically as they have evolved over time, and many such cameras in mobile devices have become sophisticated in the capturing and editing of pictures. Photograph resolution has also become significantly better, and the caliber of built-in lenses continues to improve. Further, editing options for cropping, treating or changing pictures based on the user's artistic input are available on many mobile devices.

Of course, when a user captures a picture on a mobile device using the built in camera, the picture is retained or saved in a digital format in the memory or on a memory card on the mobile device. Further, these pictures are now more frequently uploaded by users to cloud storage so that the picture can be viewed on a wide array of digital or electronic devices, as selected and preferred by the user.

SUMMARY OF THE INVENTION

Sometimes, however, a user may wish to have a hard copy or printed version of the photograph, document or other type of file, so that it can be framed or otherwise displayed in a more permanent position, and viewed without reference to, or the aid of, any digital device. Procedures and mechanisms for obtaining physical printouts for digital photographs captured by a mobile device are available. Typically, this would require downloading a dedicated app created by an entity for this purpose, as referred to above, or transferring the digital image to a computer wirelessly or non-wirelessly from which it can be printed or sent to a remote location for printing.

As mentioned above, acquiring a print version of a digital image may necessitate that the user download an app onto his or her personal mobile device. Further, the app may require sign in procedures each and every time it is used, and sign up procedures whereby a user is required to provide personal details, including name, email address, credit card information, physical addresses, as well as other information. Additionally, sign in names and passwords must be created and remembered. Once this has all been set up, the user must then open the app on the mobile device, and follow a number of steps and procedures. These may include initiating the order, identifying and attaching the photographs which are to be printed, and sending these to a remote source where the picture will be processed and printed. For many less sophisticated or impatient mobile device users, these multistep procedures pose frustrating and time-consuming obstacles. Even for those more familiar with using mobile devices, the number of steps needed to acquire a print copy can be annoying and unnecessarily time-consuming as well.

The present invention is therefore directed toward a simplified and easy to use system and mechanism by means of which a mobile device user can easily and quickly transmit a digital image located on the mobile device to a remote server or source for printing, and receive a printed corresponding picture in the mail within a short while thereafter.

One advantage of the picture ordering and processing devices, system and method in accordance with the invention is that it does not require any downloading of apps, or signing into such apps when a printed picture is desired. The user will be spared the efforts of finding a suitable and quality app from a typically abundant choice of options, and thereafter downloading the app or opening it when a digital picture, or multiple digital pictures, need to be printed.

Moreover, the invention can fully operate and function without any email address from the user. No email exchanges are necessary to carry out the procedures which constitute this invention. Still further, the invention does not require the use of a laptop or regular computer by the user who requires the printed photograph, although of course computers, printers and other hardware are required by the system of the invention. Nor does it require any services typically associated with the use of a computer, such as an Internet service provider and the ability to connect to the Internet. The invention operates free of these encumbrances and complications. All that is needed is a mobile device, such as a cell phone, which incorporates a camera, or a gallery file for storing photographs taken by the mobile device or received electronically by the mobile device, and the ability to send text messages to a remote location server. Nothing further in the way of electronic hardware is required. Further, no special software or apps are required. The user can typically enjoy the benefits of the invention with a cell phone device as purchased.

Since only a mobile cell phone device may be needed, the present invention makes it much simpler for a user to obtain print photographs and documents. It therefore provides a procedure which may appeal to, for example, many older generation users, empowering them to participate in modern and convenient technology in a simple and straightforward manner with little or no learning curve. Such users need no computer or email capabilities, but can easily utilize the benefits of the invention as a result of its simplicity, ready availability and low-tech features.

In accordance with the invention, there is therefore provided a picture ordering and processing method and system in which a user sends a text message from a mobile device to a designated remote server or computer, the text message incorporating or attaching the photograph or photographs which are to be printed. The photograph would be located in the mobile device from which the text message is sent, so it can be easily attached to the text message.

Preferably, the user will have established an account at the remote server or computer, and this remote source will recognize and identify the origin of any text received such that further identification of the originator, inputting of user names and passwords, and other processes can be avoided. Receipt of the text message will for the most part be sufficient for the remote computer or server to recognize the originator for all purposes, and to process the order, after an initial setup. The computer will produce printed versions of the digital image on a printer, as defined by the user, and such printed versions of the digital image would then be mailed to the originator. The system offers a convenient and simple to use procedure, without the bother of opening apps, signing in with a username and password, attaching photographs, and sending to the remote source.

In accordance with the invention, the remote source may typically comprise a computer, banks or multiple computers which may be networked, or a mobile device or server which receives the text message. As mentioned above, the remote source computer or server recognizes the origin of the text by recognizing the telephone number from which the text comes.

In accordance with the invention, the remote computer receives and identifies the digital photographs for printing. It then directs a printer to print the photograph on photographic or other suitable media. Since the associated data on the computer includes the location of the user or customer, the invention facilitates packaging of the prints, and then sending them on to the originator, whose address is stored. The entire process can be substantially or even completely automated by a series of machines and devices, namely, computers, printers, and mailing devices. Hand processing and mailing may also be used. The system would also debit a designated payment source from an account created by the originator based on the size and number of photographs, as well as any mailing or shipping fees, and transfer funds for the order from the customer designated payment source to the designated bank account.

In a preferred form of the invention, both the sign up procedures and the ordering procedures are simple and streamlined. Preferably, all of these steps are carried out using an exchange of text messages between the mobile device and the remote computer or server. For example, to sign up, a user will send a short text message from her mobile device to a designated phone number, which is received on the remote server. The phone number will access the computer device of an entity which receives digital pictures, prepares commands to a printer to print them, and mails them to the originator. In response to the initial text, the computer of the entity will text back to the originator's telephone number asking for the user's name, address, and billing information. Other information may also be requested, such as a default print size (for example, 4×6 or 5×7). These text exchanges between the mobile device and the remote server may be multiple in number, where the user is asked for a single piece of information for each text sent, or consolidated, where the user is asked for several pieces of information with each text sent. The user may select on her mobile device an option based on what is more convenient or comfortable for that user.

It will therefore be seen that sign-up is easy and streamlined. Most people are familiar with preparing and sending text messages, and will therefore be working within their comfort level in signing up.

After sign up, the user may simply send a text message from his mobile device to the remote computer, the text message containing the digital photograph to be printed. Once more, texting photographs is common and simple, and the vast majority of people are familiar and comfortable with this operation. The stored photograph in the digital library of the user's mobile phone is selected to accompany the text message, and shared with the server or computer of the entity referred to above. The entity hardware would recognize and identify the user from the telephone number of the mobile device of the user. In sending and ordering a print of a digital photograph, the user may also have the option of selecting the quantity of any photograph required, and the physical size thereof. This information would also be provided by the simple exchange of text messages. As noted above, the user may select a default picture size and number which would be applicable absent any changes thereto.

The digital photograph transmitted to the processing entity by text message would then be forwarded to a printer and is printed and packaged by the entity and mailed to the user whose physical or delivery address would be stored on the computers of the entity and associated with the mobile device phone number from which the text message and photograph were received. Furthermore, the user's credit card, debit card, or other selected payment procedure, also on the computer of the entity and associated with the mobile phone number, would then be charged for the printed pictures and the mailing or shipping costs. From the printing entity's point of view, the entire procedure may be fully or mostly automated on its server hardware and printers and mailing machines from beginning to end, so that a digital photograph may be received, printed and mailed within hours, and received by the user within normal mail delivery times. Further, the user may have the option of selecting an expedited delivery process utilizing a courier service, and the additional charge for this service would also be billed to the user's selected payment method.

DETAILED DESCRIPTION OF THE INVENTION

Figure 1:
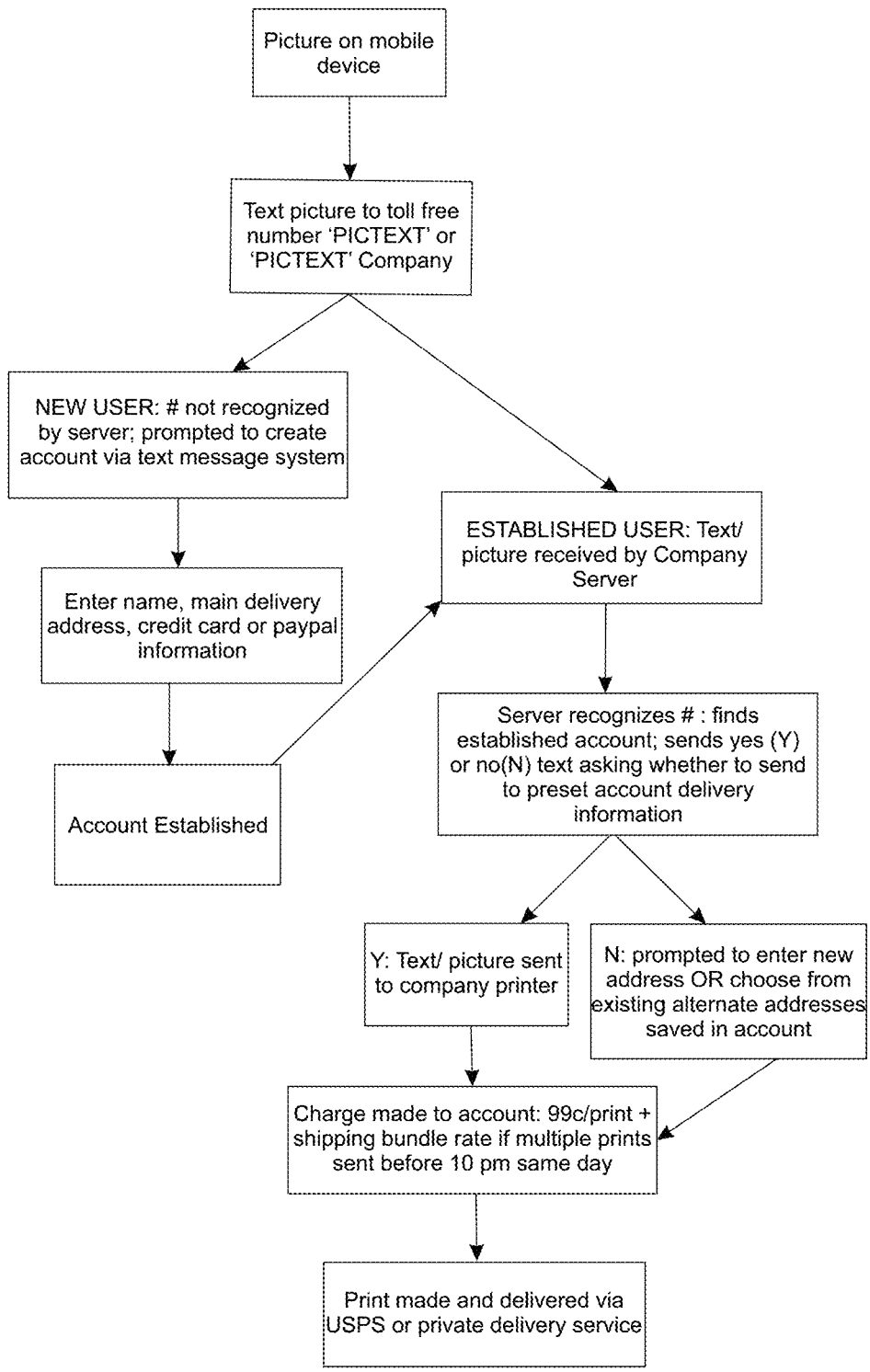
FIG. 1 is a flowchart showing the various steps and procedures of the picture ordering and processing method and system in accordance with one aspect of the invention. While this may be a preferred form and sequence, the invention is not limited to the precise steps as shown in the flowchart, and variations are permitted within the scope of the invention.

The invention is a simplified and easy to use system whereby digital photographs or other digital material which is stored on the mobile device of a user may be transmitted to the server of a processing entity for printing the digital photograph on photographic paper or other suitable media, and delivering these to the user.

Digital photographs captured or downloaded by and stored on a cell phone may be printed by texting a saved photograph on the cell phone to a telephone number, which may be toll-free, and a print of that photograph is delivered within days. No cell phone application, also known as an app, or website service is needed. The invention utilizes texting technology, and all communications between the consumer and the processing entity, or printing service, is carried out via text exchanges. The user need not even have an email address or a computer to use the system of the invention.

A stored digital picture is thus transmitted by text from the mobile device to a toll-free number, and received on the processing entity computer server. The server recognizes the texting phone number, and matches it with a related customer account, which has previously been created. Upon confirmation of the customer information, the account and payment directions of the customer is charged. The server sends the text picture to a printer, with information for matching the picture to the customer as well as directions relating to print size, print number, and the shipping address. The printer makes the paper print of the photograph on the selected medium, such as gloss or matte photographic paper, and the shipping address may be printed on the rear side of the printed photograph as a convenience, in one optional version of the invention. The address may also be attached in the form of a label, which can be peeled off or removed by the customer. This printed address on the back of the photograph would preferably show through the window of a matching mailing envelope. The printed picture is ready to be mailed to the customer.

In one aspect, the first time that a customer sends a picture via a text message from the mobile device to the processing entity computers or servers, the customer is prompted to set up an account by exchanges of a series of text messages between the processing entity and the customer. The account information includes the customer name, mailing address, billing address, credit card or other payment information, the default size of the print, and, optionally, alternative or additional addresses for family and friends. This information is all stored on the computer of the entity and associated with the mobile device phone number for future use.

Typically, a default print size would be a 4"×6" glossy print, which fits into a standard photo album. The customer would, of course, be able to select other options.

Once an established customer sends a photograph in digital form from her mobile device to the processing entity computer, they may be given the opportunity to continue with previously provided settings, or to change the settings based on any change of address, print size etc. If the customer texts that no changes are to be made, the saved and stored addresses and print sizes will be utilized. Changes for specific orders would of course be recorded so that the mailing address, picture size, or other criteria are utilized in processing the order according to the instructions of the customer.

In one form of the invention, the processing entity will not retain any photographic data on its computers. If additional or different size versions of a previously texted photograph are required once more in the future, the customer must start the process again. Only the basic customer information is kept on record and stored. In this way, privacy concerns of the customer are addressed, and private photographic material is not retained on the computers or servers by the processing entity. The invention may, however, allow the customer or user to select an option where the photograph(s) are retained.

The attached flowchart shows the sequence of steps generally described above. A digital picture captured and stored on a mobile device is transmitted by text message to the receiving entity server. A new user would not be recognized by the processing entity since the mobile phone number is not stored on the servers, and the user would be prompted to create an account by back and forth exchanges of text messages, thereby providing basic information. A prior user would not have to repeat this step, and the photograph texted to the processing entity, together with appropriate information, would be sent directly to the server. The user would choose whether to continue with preset accounts delivery information, or make changes as desired for the current order, or for all future orders. Such changes would be entered, prints made, sealed in an envelope and mailed to the customer.

In various options and alternatives, a customer with an account may be able to text message a word such as "vacation" to the receiving or processing entity. The receiving entity computers may then text a response such as "date home?", whereupon the customer would enter the date they are returning home from vacation, which would be stored. The customer account would therefore be in a "vacation status", and all pictures texted to the processing entity during the relevant period may be mailed out in bulk prior to the customer arriving home. When the customer has arrived at home after the designated date, the account would revert to normal status. Variations on the processing of orders when the customer account is in a "vacation status" are within the scope of this invention.

A user may also request information relating to the processing entity, such as a full description of various services. This may be achieved, for example, by texting the word "info" or "information", and a text reply would provide relevant details. This is information stored on the server and can be updated at any time, and selected information in a reply tailored to the needs of the person enquiring, if this is feasible. The processing entity may also have an Internet website whereby a user can access the website for further information. Although no order and printing services need be available on the website, which may have information only, it may be a useful mechanism for disseminating information relating to the processing entity. A user may even be able to sign up on the Internet website page through secure procedures, if preferred.

The invention may also be used where a customer does not have a printer or copier and needs a document copied. In such a case, the user can simply photograph the pages of the document, and send the stored photographs of the document to the processing entity. The document will be printed, on regular paper if preferred by the customer, and mailed. In another option, a document stored or downloaded on the mobile device which may be in PDF format, may also be sent by test message for printing, as described above.

The invention may be particularly useful for older people who may not be as familiar with mobile devices and other computing hardware as young people are who grew up with these devices. Therefore, the simplicity of the procedures and methods of the invention may in fact have the consequence of empowering older or less sophisticated, or even less patient, technology users. Many of these users may be more confident using the steps of the invention, and also utilizing texting technology in their daily lives.

In another variation of the invention, a user may choose an "album" option wherein the processing entity will receive texted pictures, but hold them until there are enough of these photographs to fill a folder album. The customer would choose an appropriate album during a dedicated and specific setup procedure for this purpose. In this option, the processing entity would print and fill an album for the customer, rather than sending photographs one at the time. Different types of albums and related options may be offered. For example, the album may have useful information printed thereon, including family names, dates of pictures and location of pictures. This information may be on the exterior of the album, or specific information may be associated with selected pictures.

In another form of the invention, there may be provided an off-site "Print Shop Vending Machine". In this particular embodiment, the invention comprises a kiosk, or box, which may be of the standalone type, and which may be located in either public areas or private areas. For example, the kiosk or box may be located in retail outlets often frequented by consumers, such as grocery stores, pharmacies, and certain restaurants. These are examples only, and the invention is not in any way limited by the location of the box or kiosk.

The box or kiosk, which would incorporate a printer, will preferably have its own phone number so that consumers may text from a mobile device photographs or other files for which a hard copy print is required. The consumer will therefore send a text to the box or kiosk at its dedicated telephone number, preferably prominently displayed on the box or kiosk, and the box or kiosk will incorporate the necessary hardware, programming and other systems for receiving and printing the texted photograph. The kiosk or box may wirelessly connect to the entity servers and computers at a central location, or cloud-based server, so that a previously signed up consumer will not have to re-enter information to create an account. The kiosk or box would be capable of recognizing the telephone number from which the text has been received, and linking to the appropriate account on the entity servers. This would be achieved by the ability of the kiosk to send and receive information through the Internet, wired or wirelessly, to a central or other server.

The photograph or document would be printed by the box or kiosk at that location, and appropriately dispensed at that box to the consumer for immediate pickup and delivery.

The consumer may also text the photograph to the box or kiosk from home or another remote location in anticipation of being at the location of the box at a later time. In such a situation, the photographs or documents would be printed but held within the box or kiosk. When the consumer arrives at the box or kiosk, he will send a text to the phone number by which the kiosk may be identified, and this will constitute an instruction to the box that the previously printed photographs can now be dispensed safely, for pickup by the consumer. Until then, the photographs would be physically stored in an easily retrievable manner so that they can be dispensed when the customer indicates her arrival at the kiosk or box, as noted above.

If an existing client or customer texts a photograph to the kiosk with printer, their number would, as mentioned above, be recognized, so that the appropriate account can be charged and immediate printing and delivery of the photo or document at the remote kiosk and printer can be effected.

However, if the phone number is not recognized as a current customer, this new customer would have the option of payment in different possible forms. The kiosk may be set up to receive and process a credit or a debit card, from which payment can be made. In addition, the kiosk may accept cash payments and deliver change as necessary, if the consumer prefers to attend to payment in this manner.

Of course, a new customer using a kiosk or box may also be given the opportunity to open account by an exchange of text messages, as detailed above, so that his telephone number will subsequently be recognized at any telephone number which may receive such texts within the system of the invention, and which are capable of printing attached photographs or documents for delivery through email or a Courier service, or by dispensing at a selected kiosk or box.

Certain venues for location of the box have been mentioned above, but there may be other obvious places where boxes or kiosks may be placed, either on a more permanent basis, or temporarily for a given event or occasion. Thus, boxes or kiosks may be placed at airport lounges, train stations, recreational park areas, theme parks, to name a few such places where people may often take pictures and may wish to have a print copy of the picture without delay. The box may also be set up to assist consumers who require photographs for passports, travel documents, and drivers or other types of licenses. Popular vacation spots would also be good places to place one or more of these kiosks or boxes. The boxes may, especially when located outside of the store, have appropriate hardware for securing them against damage and theft.

According to the invention, these standalone or remote kiosk and printer combinations would need only an active telephone line, which can be a landline or a wireless line, and an electrical power source. However, the power source may be batteries, solar or wind power, which may supplement or replace conventional electric outlets. They may also be capable of connecting to the Internet to effect communication, so that the kiosk's dedicated phone number may receive calls through a central or other server which would direct and send on the text and photo to the relevant kiosk.

While the box or kiosk would generally operate automatically, some maintenance would, of course, be required, including printer servicing and toner or ink or photographic paper replacement. Such maintenance may be simplified and modular, so that employees or personnel at or near the location can be trained to replace, for example, the ink or toner, perhaps in return for a percentage or portion of the revenue which may be generated by the box or kiosk. New ink or toner or photographic paper may be fitted to a printer through a specially configured door or opening so that maintenance crews would not have access to other portions of the kiosk. The box may also have the ability to send to the central server or a central maintenance office notifications of any malfunction, or complaint by a consumer, and also provide advance warning that ink, toner or other replaceable items need to be serviced. Such a central maintenance office may then dispatch its own employees to make the necessary changes and replacements, or may contract with local service people to carry out this task. For those boxes or kiosks which are capable of receiving cash and dispensing change, periodic visits to the kiosk to remove payments and ensure adequate reserves for making change will need to be arranged, so that the box does not become a target for vandalism or theft for the cash therein.

The invention may have many different variations and embodiments, and is not limited to the specific details set forth above.

Figure 2:
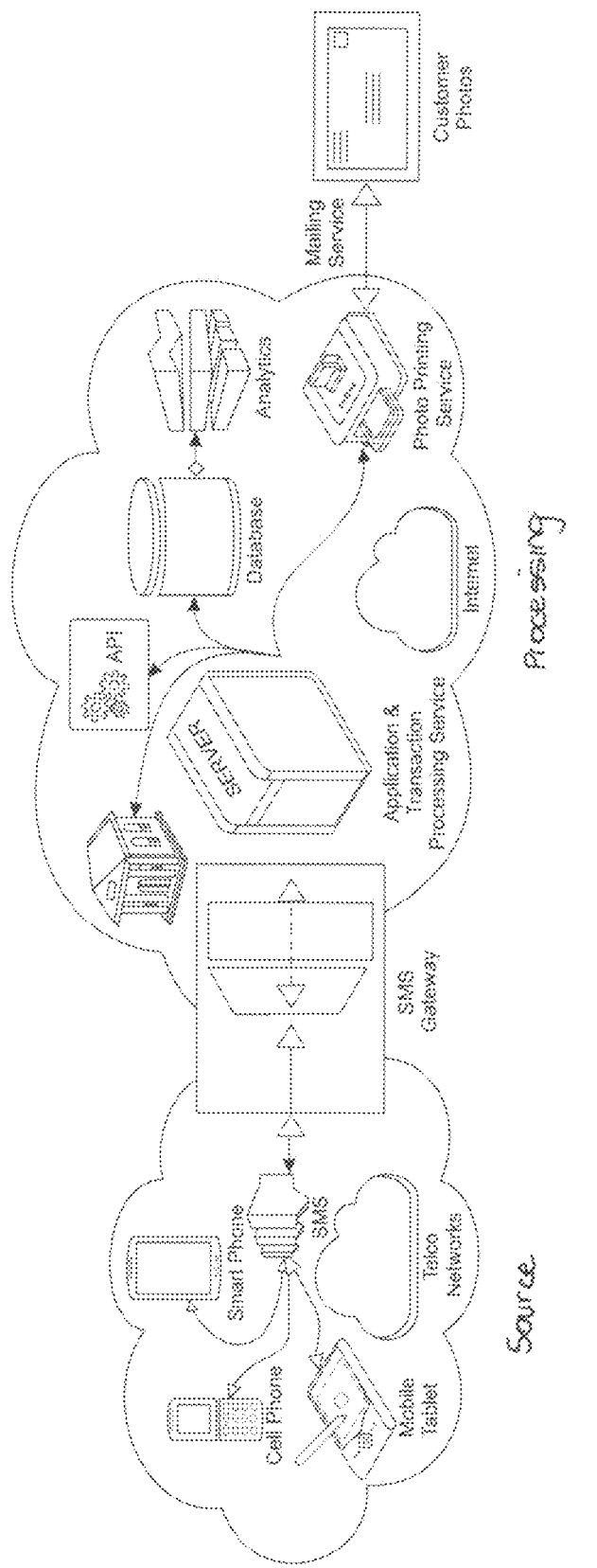
FIG. 2 is a schematic representation showing various items of hardware, steps and procedures in accordance with a further aspect of the present invention.

Reference is now made to FIG. 2 of the drawings. In this figure, there is shown schematically the hardware and lines for the flow of information from a telecommunication network via text to an SMS gateway, which makes the data suitable for processing into the photo printing and delivery system in accordance with the present invention. This includes the necessary financial transactions, as well as all other possible utilizations. In this figure, there is shown an SMS gateway. The SMS gateway may be fed data from a number of different devices or sources, including but not limited to cell phones, smart phones, mobile tablets, through the Internet or other telecommunication networks. Through the SMS protocol, the data is fed to the SMS gateway, and thereafter transmitted to the processing system and hardware of the present invention. As indicated in this figure, this includes the application and transaction processing hardware and machinery. The data, or selected portions thereof, are processed to the financials and payments section, to other system components, and to a database for analytics and other purposes. The data is further transmitted to devices for photograph or document printing, and the prints generated thereby are appropriately packaged and forwarded to the customer through the mail, courier service, or other appropriate delivery system.

The SMS text and associated photograph transmitted through the SMS Gateway is received at a computer or server, where the mobile device phone number is either recognized as one stored in the database, or not recognized so that a new account can be set up utilizing information obtained by exchanging text messages and thereafter stored within the database of the computer system. The photograph is sent from the computers to a photo printer, and information relating to the nature of the order (number of photographs, size of photographs, delivery options etc.) is sent to the database and analytics device or component thereof to process the order. This involves charging the appropriate accounts stored in the system and associated with the mobile telephone number, and printing labels or other media so that the photographs can be delivered. As noted, once all relevant information has been analyzed and printed, the photographs are packaged in an envelope or other appropriate container, and mailed or otherwise delivered to the customer in accordance with selected directions and instructions.

In yet a further aspect of the invention, the process may be used in other forms and contexts by persons or customers wishing to order a grocery item or any other item with a standard barcode label on the item. The user would photograph or take a picture of the barcode, and send by SMS texting the photograph of this barcode to the servers created in accordance with the present invention. The product desired would be identified by the barcode, processed by the system, and the product would be packaged and mailed to the user in a similar fashion to that described above with respect to the delivery of photographs or documents. Forms of identification of a product other than the barcode may of course be used with the same effect.

In other words, an extremely simple and efficient system is created whereby the user essentially text a picture of the barcode of the product, and the product will be delivered to the user. The user would be identified using her mobile telephone number as the account identifier, just as is the case with respect to the delivery of photographs, as described above. Of course, an initial setup of the account would be necessary, but this, too, is a simple procedure effected by the exchange of text messages.

In yet another application and context for use of the invention, the hardware and method of the invention may be used at events and parties, such as weddings, anniversaries, bar mitzvahs and the like. Pictures taken on mobile devices at such an event may be processed in accordance with the invention. In one embodiment, the event host may pay a designated cost or fee based on the number of pictures which they would like printed, or authorize for printing. A kiosk or box as described above with a special telephone number to reach text messages and photographs can be sent can be placed at the event site. Photographs can be sent to this kiosk and printed immediately. Guests at the event are able to text pictures and have them printed on-site in real time at the kiosk, which may be at no cost to the guest since the host has already paid for the service. These photographs taken by the guests, additionally, will be stored in the system, and at the end of the event, the hosts will also get a set of all pictures, either printed, digital, or both as desired. In this way, the host may be in possession of a large number of intimate or spontaneous photographs, which a professional photographer may not be able to accomplish.

Also, events such as music concerts, Coachella, and the like may also have access booths or kiosks. Photographs texted to the booth or kiosk can be printed, or delivered to an address. The booth may also take photographs of guests at the event, that can be delivered to a designated address, which would save the person from having to carry around a printed picture at the event, which could become damaged or lost.

The above could be accomplished by entering a mobile phone number at the photo booth, which would be recognized by the entity servers and computers, associated with the relevant account, so that the pictures could be delivered. If the number is not recognized, a simple account setup can be effected on a photo booth keypad, or through an exchange of text messages, as described above.

In one further embodiment, users communicate with the hardware and system of the invention through their mobile devices, such as cell phones, smart phones and tablets, using SMS, native mobile and messenger applications. The SMS messages, including the messages with selected images stored on the mobile device, are received from users in a global telecommunications network, and are then processed by an SMS Gateway service and delivered into a computer with application service. Messages from native mobile and messenger applications may be delivered to the computer with application service directly.

The computer, including operating software and data, authenticates, validates and processes received messages. Message processing includes short-term persistence of the message into a message store for auditing purposes. The system's analytics subsystems perform statistical and analytical processing or stored data and produces various reports on the system usage, trends, profitability, and other information, which may be utilized for marketing, financial planning, or other purposes.

The system of the invention may further provide an external API (Application Programming Interface) for integrating with various external systems and services, such as social networks, image processors, storage solutions, billing and printing services, to name a few. Transactions would be considered as completed when the uses photographs are printed, mailed and delivered to the customer's address.

Figure 3:
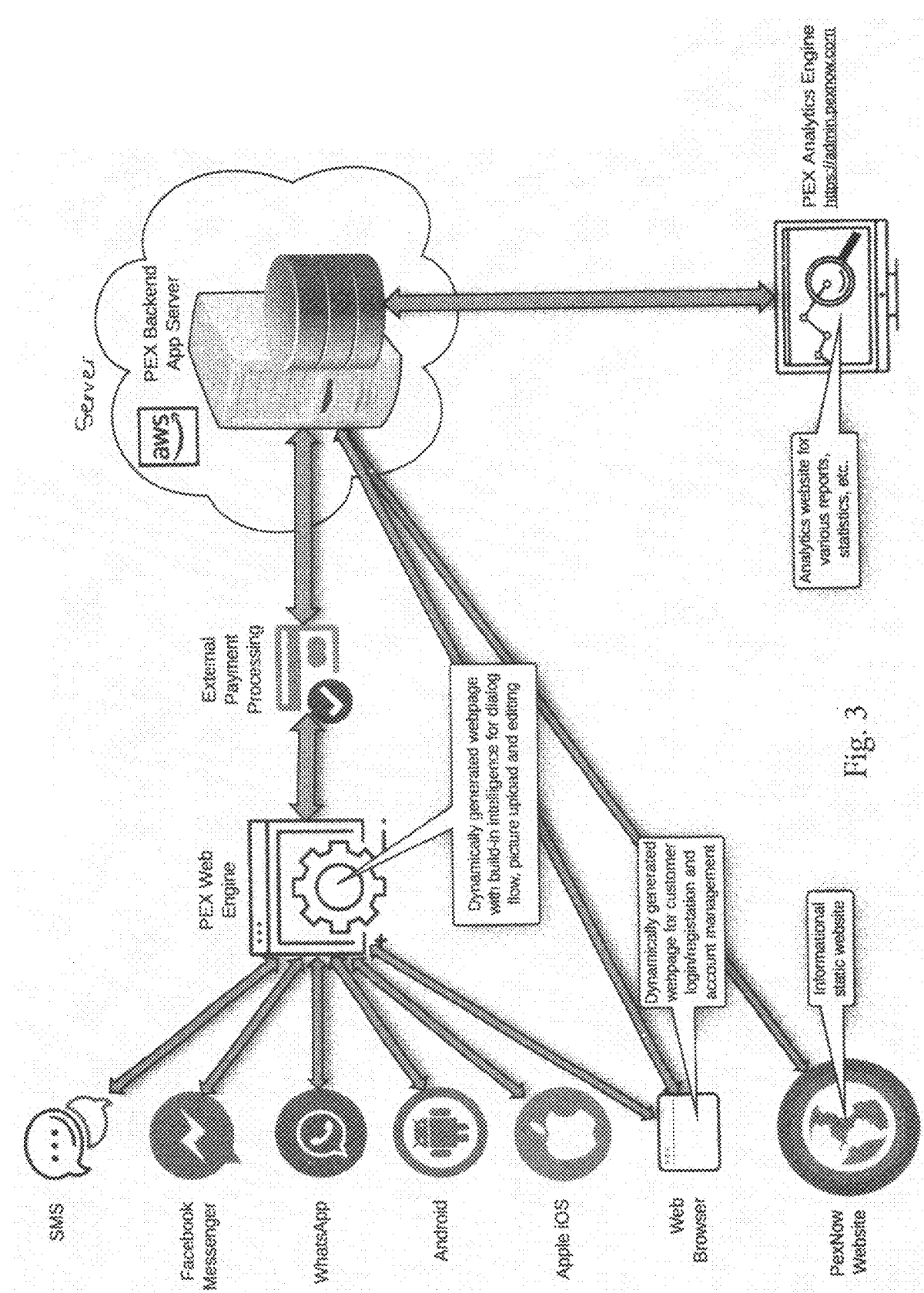
FIG. 3 is a schematic representation showing one configuration of a system for processing data from various sources and providing analysis thereof.

FIG. 3 of the drawings shows a schematic representation of one version of the invention. There is shown in this figure the various types of data input and exchange devices and options, including Android and Apple devices, text messaging, as well as a dedicated website related to this process set up in accordance with the invention. See the PexNow Website in this figure. A web browser is another form of input. The data is selectively forwarded to the web engine for the process or a backend server. Information and data is exchanged with an analytics website. The system includes an external payment processing step.

Figure 4:
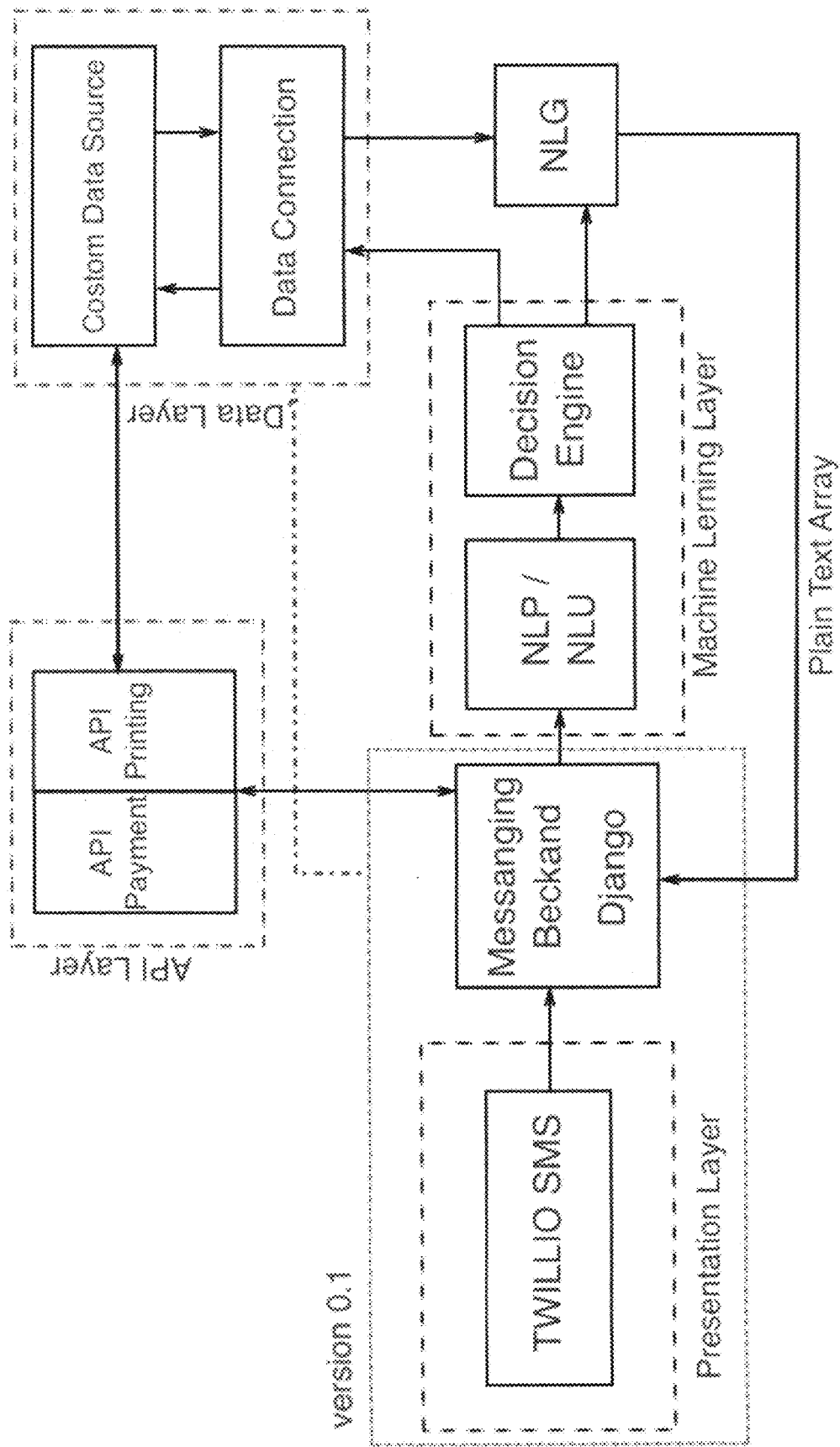
FIG. 4 is a flow chart diagram showing components and processing of data in accordance with one aspect of the present invention.
Figure 5:
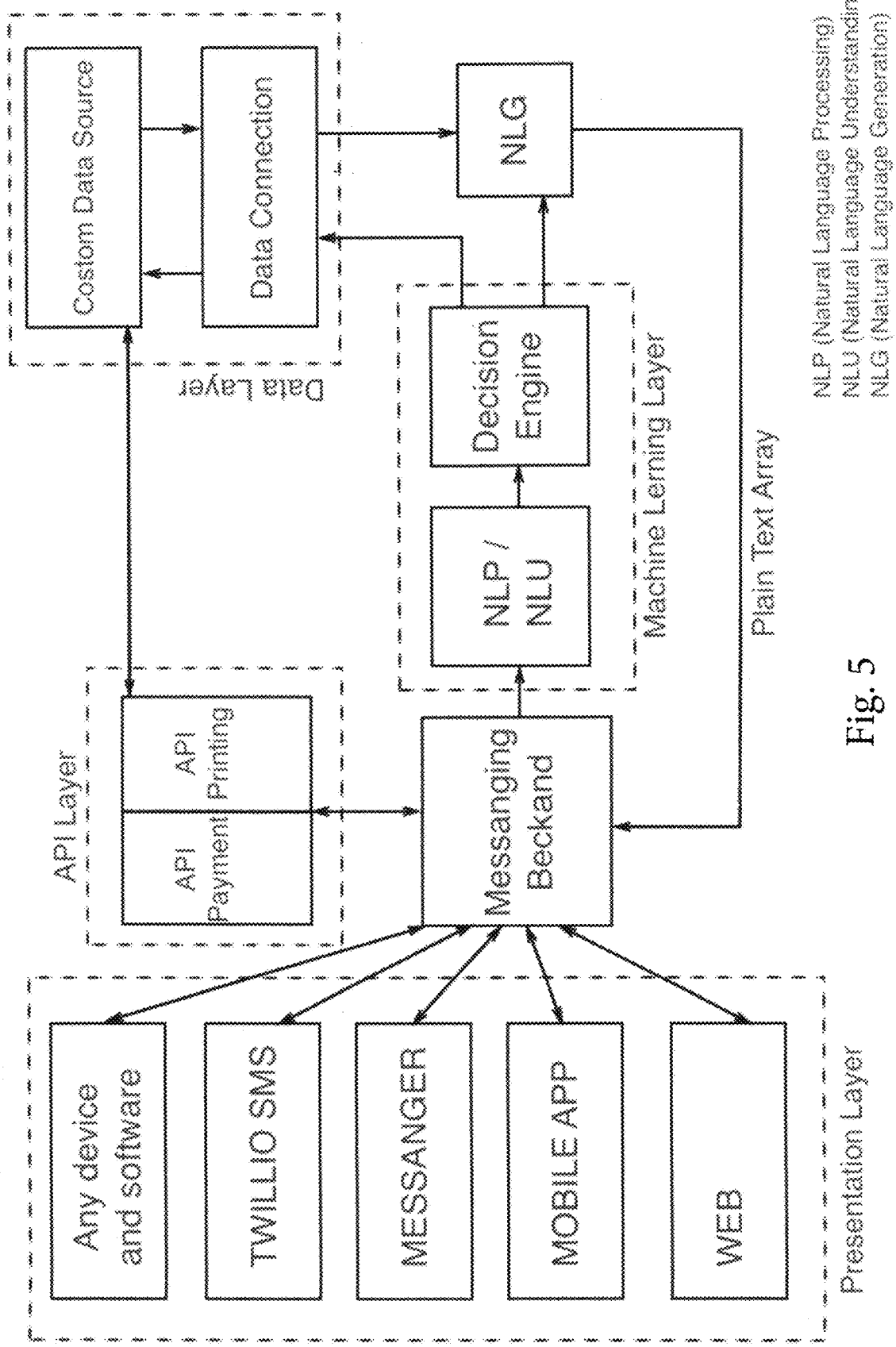
FIG. 5 is a flow chart diagram showing another configuration of comments and flows showing data processing in accordance with an aspect of invention.
Figure 6:
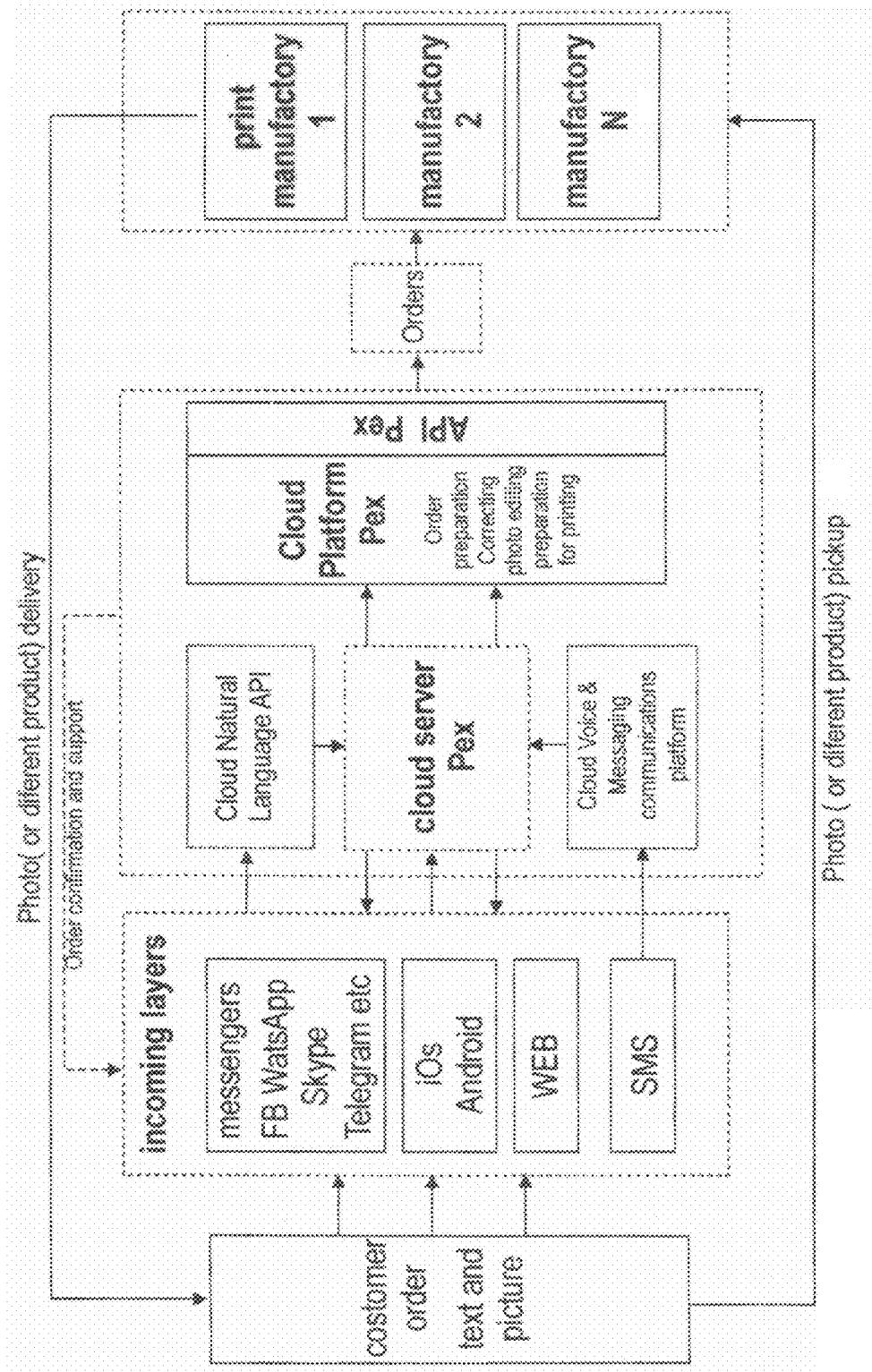
FIG. 6 is a flow chart showing the steps in accordance with one aspect of the invention for an incoming photo order, processing thereof and handling of prints.
Figure 7A:
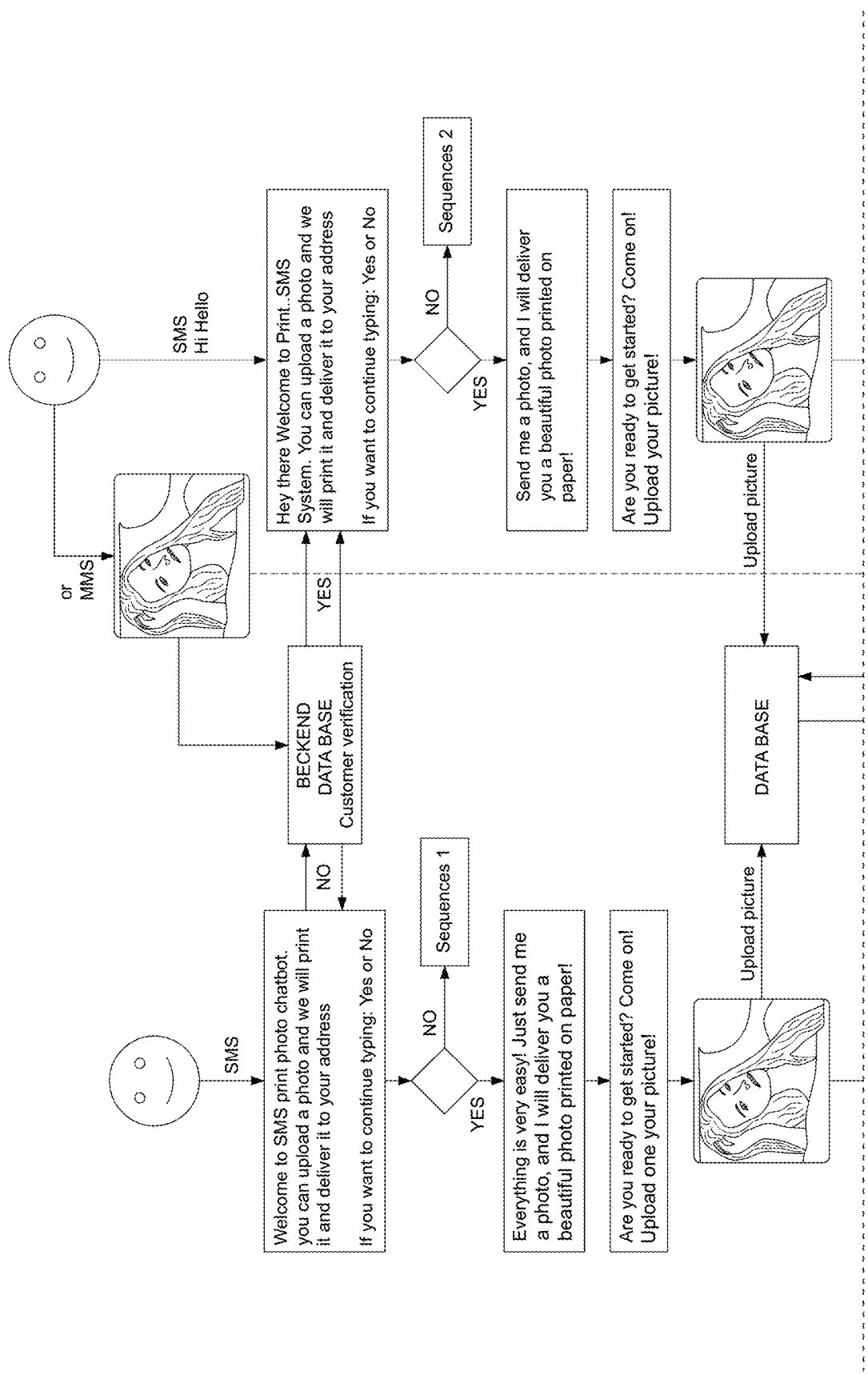
FIGS. 7A, 7B, 7C, 7D and 7E illustrate a flow chart showing in one aspect thereof user interaction with the system for submitting, processing, payment, and delivery options, and other procedures for photo orders.
Figure 7B:
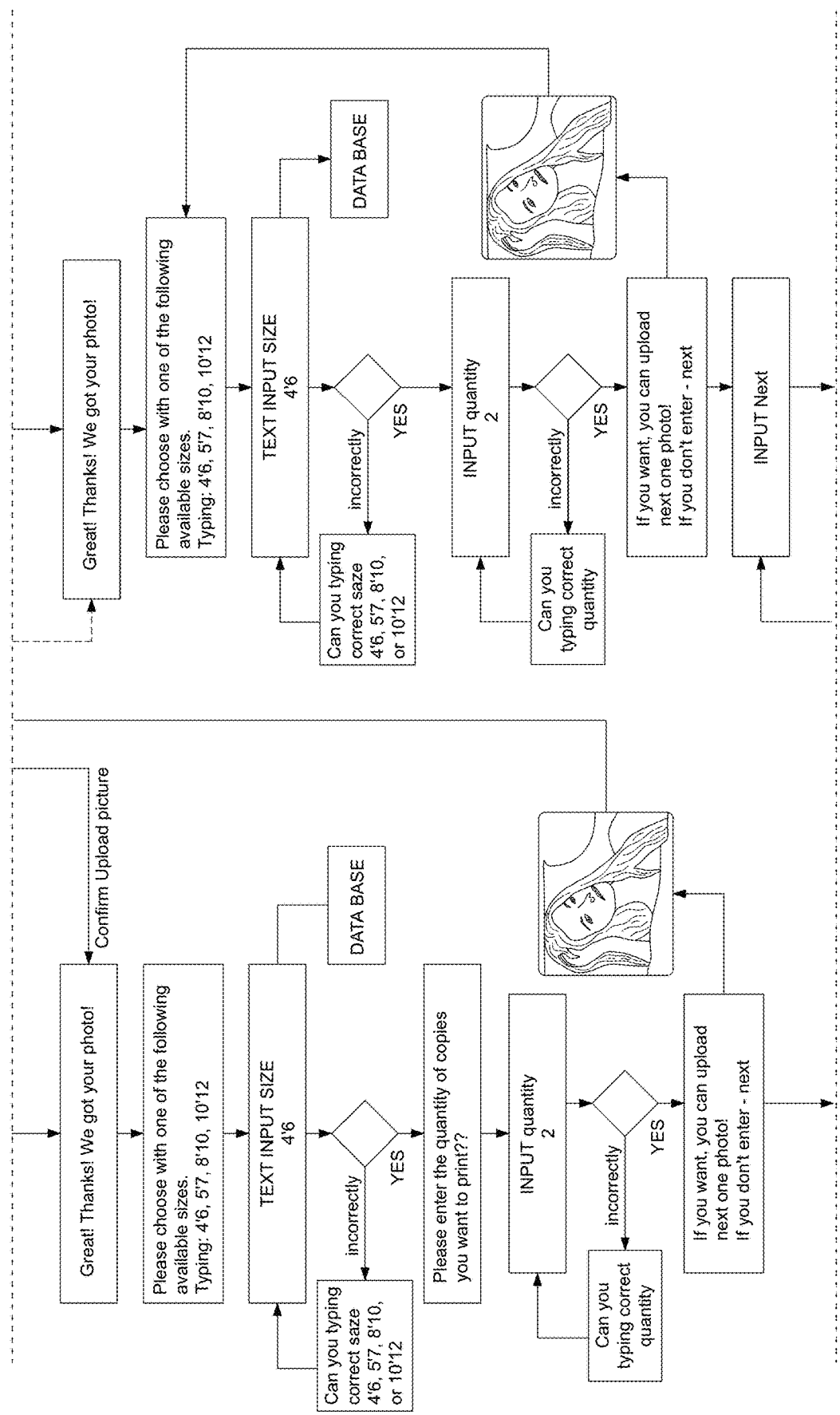
Figure 7C:
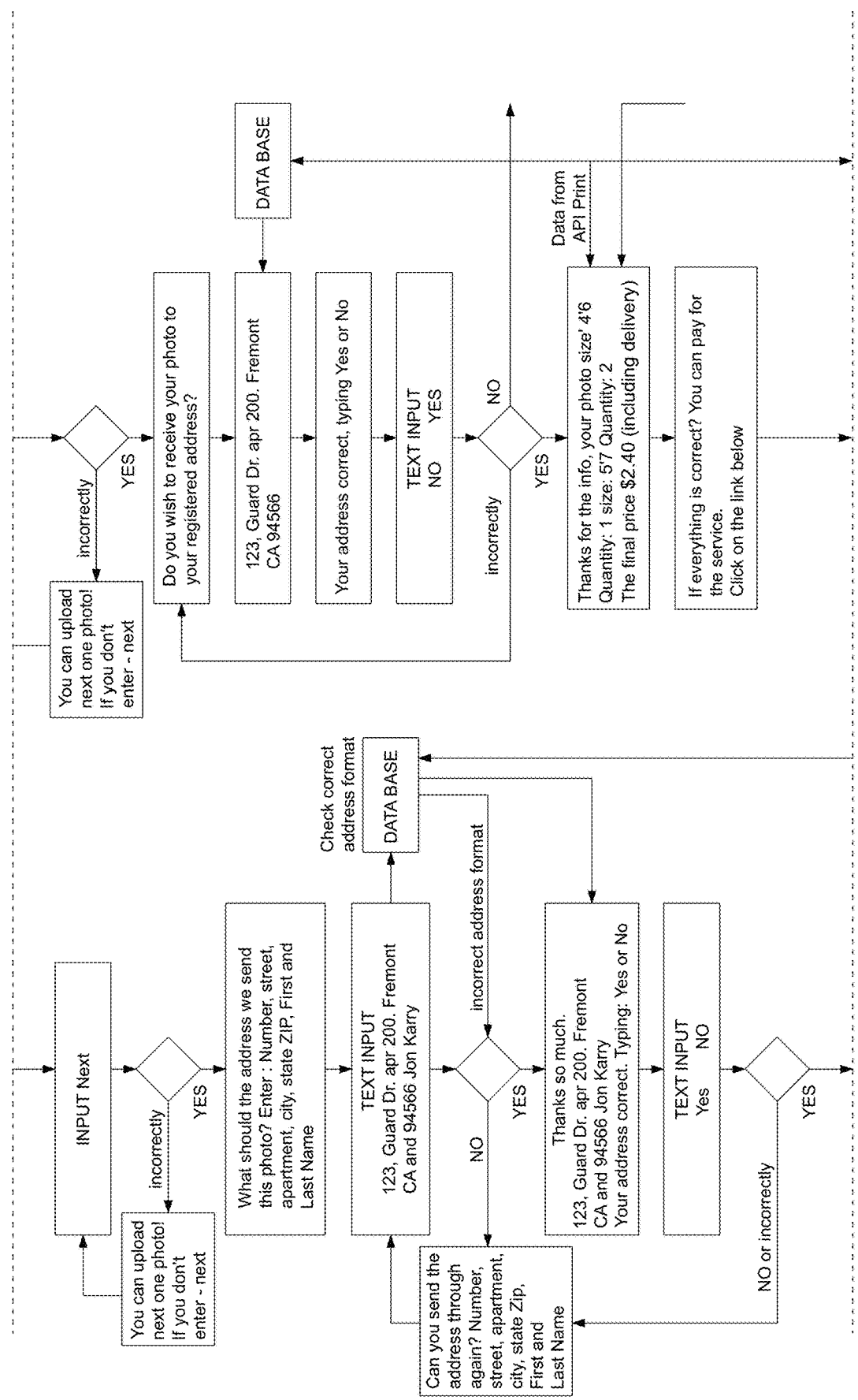
Figure 7D:
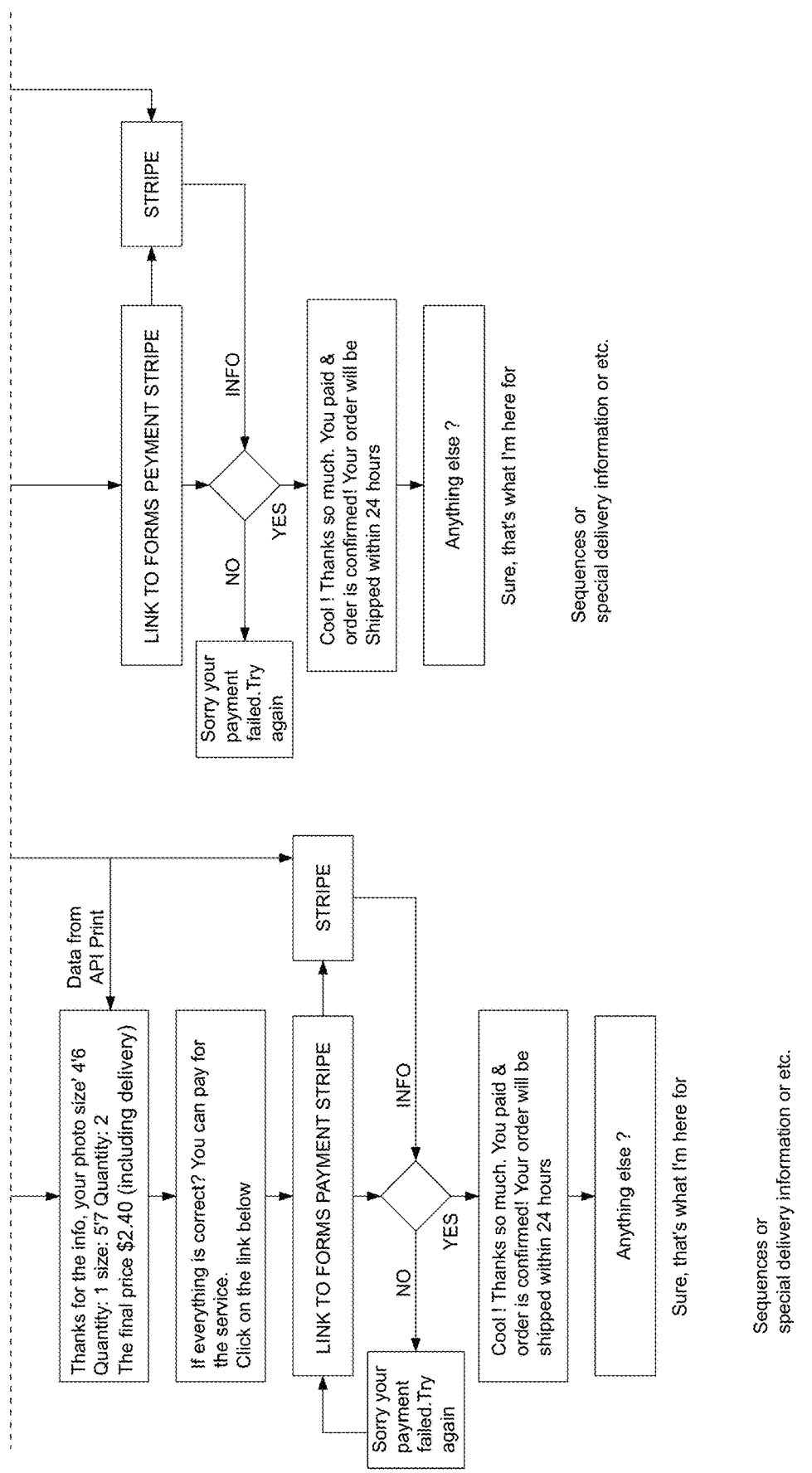
Figure 7E:
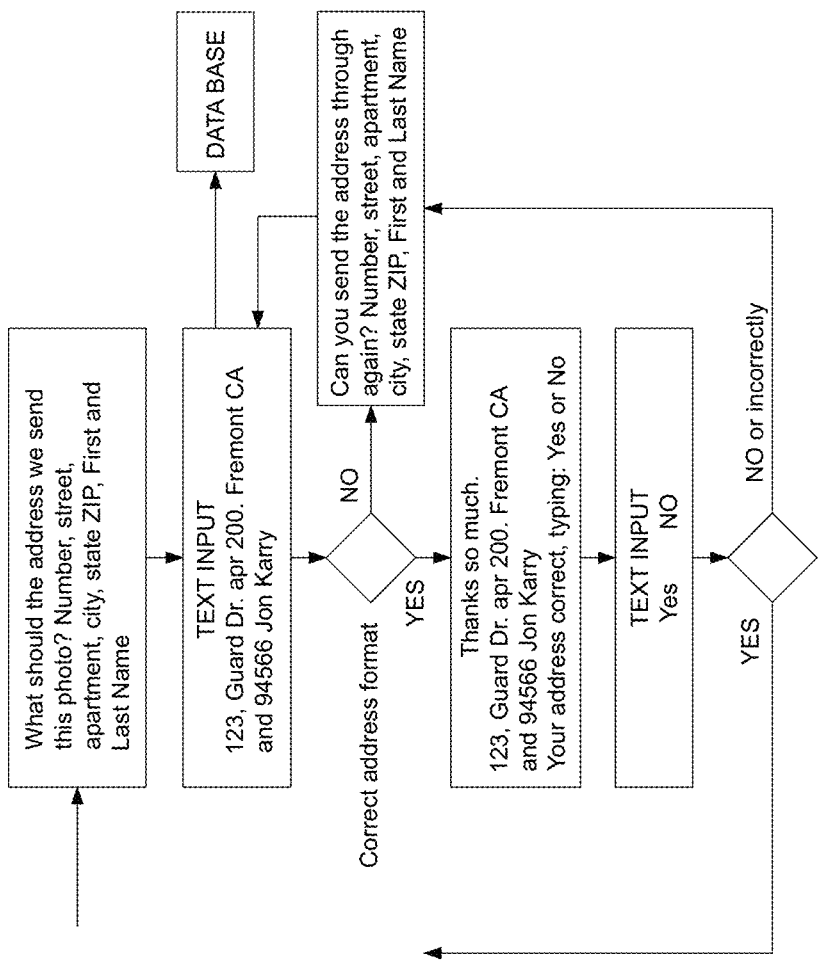

FIG. 4 of the drawings is a schematic representation showing data flow options and centers, while FIG. 5 is another and fuller version diagram showing the possible steps and sequences. FIG. 6 of the drawings shows the flow pattern including customer input of text or picture or data, the order preparation and editing, and the manufacture of the orders, as well as their return to the customer.

Figure 8:
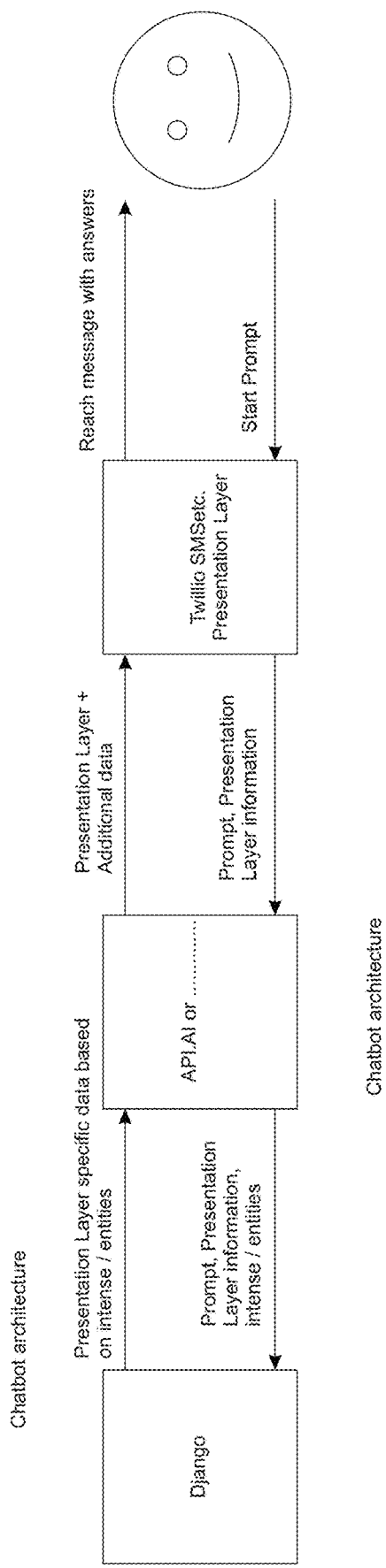
FIG. 8 is a chart relating to the detail of interaction for photo or data processing.

FIGS. 7A, 7B, 7C, 7D and 7E illustrate an exemplary exchange between a customer and the system of the invention, with a possibly typical set of options, starting with an SMS and the steps directing and guiding a user with questions and answers to move the order process or sign up depending upon the needs and requirements of a particular customer. FIG. 8 shows other interactions between different web frameworks with levels of security. User interaction with a presentation layer is processed and analyzed to assist the user through the process.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A method of processing a photograph comprising:
capturing the photograph onto a mobile electronic device having a dedicated telephone number, the mobile electronic device having a camera thereon which is used to capture the photograph, the captured photograph being stored on a memory drive in the mobile electronic device, the mobile electronic device further having a text messaging application for composing and transmitting text messages and attachments;
transmitting the captured photograph stored on the memory drive in or with a text message using the text messaging application to a remote server which is able to identify the mobile electronic device from the dedicated telephone number recognized by the remote server and associate the text message with an account stored on the remote server;
matching the mobile electronic device with information relating to the account which has been previously stored in a database of the remote server by a user of the mobile electronic device and relating to the mobile electronic device;
the remote server processing information in the text message relating to the captured photograph comprising preferred size of photograph to be printed on a physical medium, delivery preferences, number of photographs required;
transmitting the captured photograph on the remote server to a printer and printing the captured photograph on a physical medium based on and incorporating the information in the text message;
calculating costs for the printed photograph and effecting payment from the user based on payment instructions from the user; and
transporting the photograph printed on the physical medium to a destination point address contained in the information stored in the database relating to the dedicated telephone number whereby the photograph printed is delivered to the user of the mobile electronic device.

2. A method as claimed in claim 1 wherein the mobile electronic device is a mobile telephone having the dedicated telephone number.

3. A method as claimed in claim 1 wherein the information provided comprises: the user's name, the user's address, and a payment source.

4. A method as claimed in claim 1 wherein the information provided is done through text message exchanges between the mobile electronic device and the remote server, and the information is stored in the database in a manner whereby it can be immediately matched or associated with the mobile electronic device when the mobile electronic device sends a text message to the remote server.

5. A method as claimed in claim 4 wherein the remote server initiates a process of acquisition of information from the mobile electronic device when the mobile electronic device is not recognized by the remote server.

6. A method as claimed in claim 1 wherein the photograph is transmitted to the printer together with the destination point address, the destination point address being printed by the printer for use on or in association with the photograph on the physical medium to effect delivery.

7. A method as claimed in claim 1 wherein a plurality of photographs on the physical medium are collected and arranged in an album for transporting to the destination point address.

8. A method as claimed in claim 1 wherein the destination point address can be changed for a selected photograph on a physical medium upon receipt of a text message from the mobile electronic device providing an alternative destination point address.

9. A method as claimed in claim 1 wherein the mobile electronic device is selected from a cellular phone, a smart phone, and a mobile tablet.

10. A method as claimed in claim 1 further comprising security procedures for protecting information provided to and stored within the database.

11. A method as claimed in claim 1 wherein the remote server requests confirmation of default information relating to the size of the photograph on the physical medium and the destination point address each time it receives a text message from the mobile electronic device.

12. A method as claimed in claim 1 wherein transportation of the photograph on the physical medium is delayed for a designated amount of time upon receipt of instructions from the mobile electronic device.

13. A method as claimed in claim 1 further comprising placing one or more kiosks or booths at selected locations, associating a kiosk telephone number with each kiosk or booths, placing the kiosk or booth in communication with the remote server, and locating a printer within each kiosk or booths to print the photograph on the physical medium.

* * * * *